Dec. 26, 1922. 1,440,356

J. C. MORRELL.
SUSPENSION AND EMULSION AND PROCESS OF MAKING SAME.
FILED JUNE 22, 1920.

Patented Dec. 26, 1922.

1,440,356

UNITED STATES PATENT OFFICE.

JACQUE C. MORRELL, OF NEW YORK, N. Y.

SUSPENSION AND EMULSION AND PROCESS OF MAKING SAME.

Application filed June 22, 1920. Serial No. 390,882.

*To all whom it may concern:*

Be it known that I, JACQUE C. MORRELL, a citizen of the United States of America, and resident of New York city, in the State of New York, have invented new and useful Improvements in Suspensions and Emulsions and Processes of Making Same, of which the following is a specification.

This invention relates to the preparation of emulsions of pitches, tar-like substances, resins, resin gums, bituminous substances of natural or artificial origin, such as asphalt and asphaltite products and in general, emulsions of viscous hydrocarbon or pitchy organic liquids and semi-solids soluble or partly soluble in water, as well as suspensions of non-fluid or solid organic substances.

Such emulsions and suspensions are in general used for binding, adhesive, impregnating and surfacing purposes. Finely divided materials of carbonaceous or other matter may be briquetted by their use into fuel products, artificial charcoal products, electrodes and other briquetted products. Wood, paper, felt and their pulps, cement and other bodies may be impregnated or surfaced with such emulsions in order to impart the characteristics of the emulsified or suspended substances to the treated materials or bodies. Emulsions and suspensions of this nature may be used for road surfacing, dust laying, and in numerous other ways where it is desired to disseminate a viscous liquid, semi-solid or non-fluid material of hydrocarbon or organic nature throughout a finely divided solid or to impregnate or surface bodies of various natures in order to impart the characteristics of the emulsified or suspended material to the impregnated or surfaced material or body.

There are three classes of dispersions. 1. Molecular dispersion or true solution. 2. Colloidal dispersion, where the dispersed particles fall within the colloidal range of size. 3. Coarse dispersion, where the sizes of the particles or globules are greater than those of colloidal range. Emulsions and suspensions fall within the third class, because the average size of the globules and particles are greater than those of colloidal size.

When one liquid is dispersed through another in which it is partly or wholly immiscible or insoluble, an emulsion is produced. An emulsion, therefore, consists essentially of two liquid phases, a phase being considered as a physically distinct, mechanically separable part of a system. When a non-fluid or solid material is dispersed through a liquid in which it is partly or wholly insoluble, a suspension is produced. A suspension, therefore, consists essentially of a non-fluid or solid phase and a liquid phase. The term non-fluid will be used here to designate materials which physically resemble solids more than liquids, but still possess some characteristics of the latter state. For example, certain pitches, asphalts, resins, etc., have no definite melting point, but still retain their own shape, i. e., they do not conform to the shape of the containing vessel at ordinary temperatures, and, therefore, may be classed as non-fluids or solids. Further, such materials may be broken up, ground, retained in a powdery or finely divided condition, etc.

Protective colloids and emulsifying agents are materials of partly or wholly colloidal nature which render stable suspensions and emulsions once they are formed, as well as facilitating their formation.

In general, the steps of preparing an emulsion according to the present invention, are:

1. Preparation of the protective colloid, emulsifying or suspending agent.

2. Preparation of the suspension of non-fluid or solid material in a medium containing the protective colloid or suspending agent.

3. Preparation, in a medium containing a protective colloid or emulsifying agent, of an emulsion of oil or other organic liquid which will flux, disperse or dissolve the non-fluid or solid material under consideration.

Mere agitation of a non-viscous or very fluid substance in a medium containing a protective colloid or an emulsifying agent will cause the former to break up into small globules which are prevented from coalescing again by the film of emulsifying agent which forms on the individual globules. Viscous substances, however cannot be dispersed in this manner.

But when a suspension containing particles of a non-fluid or solid substance is mixed with an emulsion of oil or other organic liquid, the globules of which will flux with, disperse, or dissolve the non-fluid or solid material, an emulsion of a viscous liquid, of the order of viscosity and composition as would result were the indispersed oil and non-fluid material mixed, is formed. The mechanism of this emulsion formation can be easily observed under a medium powered microscope.

In the drawing, Fig. 1 illustrates a suspension of non-fluid or solid material.

Fig. 2 an emulsion of oil or other organic liquid.

Figure 1:
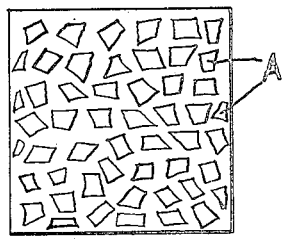
Figure 2:
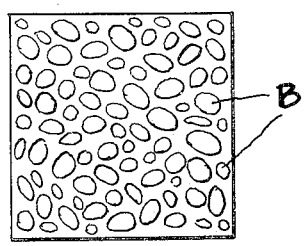
Figure 3:
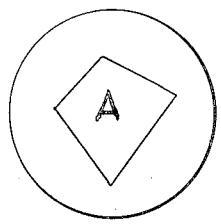
Fig. 3 shows the particle (A) of non-fluid or solid substance.
Figure 4:
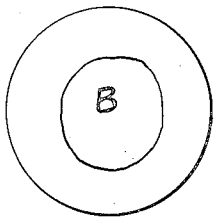
Fig. 4 shows the globule (B) of oil or other organic liquid.
Figure 5:
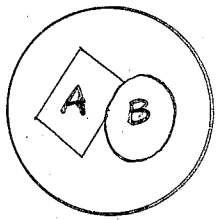
Figs. 5, 6 and 7 show the manner in which the solid or non-fluid (A) coalesces with the liquid (B) to form a viscous liquid or semi-solid (AB).
Figure 6:
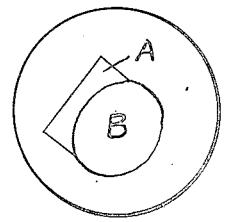
Figure 7:
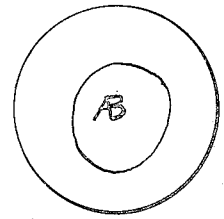

In the cases of both emulsions and suspensions the protective colloid or emulsifying agent stabilizes the system. When a suspension and emulsion are mixed the non-fluid or solid particles in the former coalesce with the liquid globules of the latter, and viscous liquid or semi-solid globules are formed which are prevented from coalescing by the protective colloid or emulsifying agent and thus form a stable emulsion. Thus, although the emulsifying agent prevents the viscous globules from coalescing with each other, it does not prevent the solid or non-fluid particles from coalescing with the fluid oil globules. No amount of agitation or stirring will cause a liquid or semi-solid of the order of viscosity of that present in the emulsion resulting from this invention to be emulsified directly. All of the prior processes require the use of solvents or of heat in order to reduce the viscosity of such material so that they may be emulsified directly, which processes are costly, in some cases dangerous and of such a nature as to be carried out on a much smaller scale than that constituting this invention.

The classes of materials which may be used as protective colloids or emulsifying agents are:

1. Proteins, which include isinglass, glues, gelatins, albumens, casein, etc.

2. Pectins, comprising the various gels.

3. Polysaccharides and hemicelluloses, which include starches, dextrine, agar-agar, etc.

4. Gums, including the various water-soluble gums, gum arabic, gum tragacanth, marshmallow, seed gums, moss gums, etc.

5. Soaps, including all types of soaps, or their equivalents, i. e., an alkaline substance plus a fat or an alkaline substance plus saponifiable oil.

6. Tannins, such as tannic acid, ammonium tannate, tannis from various barks and woods, and waste sulphite liquor from the paper industry.

7. Clays containing particles of colloidal size and other finely divided solids which contain some colloidal material, such as the ordinary clays, kaolin, various inorganic hydroxides and other finely divided, partially colloidal solids.

8. Various mixtures of the same or different groups of the above named substances can be used, and in some cases the amount of a material necessary to keep an emulsion stable can be greatly reduced by making such mixtures.

In preparing the tannic acid-ammonium tannate protective colloid a $2\frac{1}{2}$–3.0% solution of tannic acid is slowly added to a quantity of 35.0% ammonium hydroxide equal to about 40.0% of the weight of tannic acid used. The color of the solution changes gradually from a dark amber to a dark orange and this affords a valuable check in making up the solution as the darker solutions do not give as good results as the lighter ones. If instead of using this ammonium tannate-tannic acid mixture for both the emulsion and suspension, a gelatin dispersion or solution in water is used in making up the suspension of non-fluid or solid (e. g., hardpitch) a greater saving can be effected in the cost and amount of protective colloid necessary to make the emulsion stable.

1. For example: A $\frac{1}{2}$% solution of the ammonium tannate in water is prepared and can be used to emulsify an equal volume of oil or other organic liquid by agitation. A suspension of non-fluid hydrocarbon material is then prepared by agitating or grinding some of this material, in a finely divided state, in a $\frac{1}{4}$–$\frac{1}{2}$% or even more dilute solution or dispersion of gelatin or glue until a suspension of the consistency of a thin paste is made. Upon mixing the emulsion and suspension a perfectly stable emulsion of a viscous liquid is produced. By adding a little clay to the suspension before mixing in the emulsion, a still more satisfactory product will result. Any of the above named colloids can be used alone, but by using them as described, i. e., in various combinations found by experiment, a greater saving in amounts necessary is effected and the results are more satisfactory.

2. A 0.1–2.0% of glue or gelatin dispersion or solution in water with about 1.0–25% or over of clay makes an excellent and inexpensive emulsifying agent. This may be used as follows: To a 1.0% solution in water of glue or gelatin is added an equal quantity of oil, which upon agitation results in an emulsion of oil. To a 0.2% solution in water of glue or gelatin is added 20.0% of clay. By grinding this mixture with one-half its weight of a finely divided non-fluid or solid hydrocarbon material, in a liquid medium such as water, a stable suspension results. Mixing and agitating the emulsion and suspension so formed results in a stable emulsion of a viscous liquid.

Finely divided solids in general increase the stabilizing effect of the emulsifying agent as well as possessing emulsifying properties themselves, in some cases, e. g., clay contains a considerable amount of colloidal substances. Hence some finely divided solids are the equivalent of a protective colloid.

In general, the amount of protective colloid or emulsifying agent used, except for clays, kaolin and other finely divided solids, varies from solutions or dispersions which contain 0.02–5.0%, and enough of this aqueous medium is used to have present 0.02–5.0% of the material suspended or emulsified.

The following method of preparing the suspension of hydrocarbon or other organic non-fluid or solid may be used in preparing stable suspensions of almost all non-fluid or solid materials. However, for purposes of making viscous emulsions, and where the suspension itself may be used for binding, impregnating or surfacing purposes, native and artificial substances of a more or less hydrocarbon character, and, in general, of an organic nature will be considered. The substances which are generally used are as follows:

1. Pitches which, in general, are the residues produced from organic substances which decompose when subjected to destructive distillation in complete or partial absence of air, and to such an extent that a complete carbon residue is not produced. Some of the common classes of pitches are:

*a.* Tar pitches which include those produced from wood, bone, coal, shale and bitumens, water gas and oil gas tars.

*b.* Oil pitches, including the residues from distillation and cracking of animal, vegetable, and petroleum oils of asphalt, paraffin, naphthene or other base.

*c.* Pitches from destructive distillation of animal and vegetable matter including those of stearin, palm oil, bone fat, packing house fat, garbage, sewage, grease, etc.

*d.* Pitches resulting from the destructive distillation of native bitumens, asphalts, asphaltites, coal, peat, lignite, etc.

2. Non-fluid and solid bitumen and asphalts.

3. Asphaltites, examples of which are the non-fluid or solid native hydrocarbon materials such as gilsonite, grahamite, uintahite, glance pitch, etc.

4. Resins which comprise the oxidation product of the turpenes, for example, rosin.

5. Gum resins and oleo resins, including mixtures of resins and some gum, e. g., gum mastic, lac resin, copal, shellac, etc.

6. Resinified oils.

7. Heat treated wurtzilite and albertite.

8. Bituminous materials.

9. Non-fluid, especially hydrocarbon materials either free from or containing nitrogen, sulphur, oxygen, and other complex compounds, and capable of being fluxed, dispersed, or dissolved in some organic liquid or oil.

These materials are to be in a non-fluid condition.

Softer varieties of these materials may be hardened by combining with harder varieties, or by fluxing with rosin, rosin pitch, fatty acid pitch, mineral or vegetable fillers of various kinds, or by blowing with air or sulphur.

A quantity of the non-fluid or solid material in a finely divided, atomized or comminuted form (100 mesh or finer is preferable, the finer material producing more stable suspensions) is placed in a vessel and small quantities of the suspending medium, i. e., water containing the protective colloid or emulsifying agent, is added with continuous stirring and agitation until a thick, smooth paste is produced. It is usually necessary to use about one and one-half times the weight of suspending medium as of the material to be suspended in order to get a product of pasty consistency. Adding more of the former simply makes the suspension more fluid, i. e., the suspension can be made up of any consistency up to that of a thin liquid by adding more or less of the suspending medium.

For preparing the emulsion of oil or other organic liquid, the oils or organic liquid must be such that it is wholly or partly insoluble in water, and flux with, disperse or dissolve wholly or partly the non-fluid or solid material which is used in making up the suspension.

The term oil, as herein employed, is intended to include a vast number of substances, both natural and artificial, and possessing widely different physical properties and chemical structure. All of the substances included within this term are practically insoluble in water, possess a characteristic greasy touch and have a low surface tension. These include the animal oils of both land and sea animals; vegetable oils, both drying and non-drying; petroleum or mineral oils of various classes, including those of open chain hydro-carbons, cyclic hydrocarbons or cycloparaffins, with or without the presence of solid paraffins and asphalts and various complex compounds, and which may or may not contain sulphur or nitrogeneous bodies; resin oils and wood distillates including the distillates of turpentine, rosin spirits, pine oil, and acetone oil; various oils, obtained from petroleum products, such as gasolenes, naphthas, gas, fuel, lubricating and heavier oils; coal distillate, including benzene, toluene, xylene, solvent naphtha, creosote oil and anthracene oil and ethereal oils. The coal distillates are especially good solvents or dispersion media for all the non-fluids referred to, except the resins and resin gums, while for the latter the wood and wood tar distillates are the best solvents or dispersion media.

In general, aromatic hydrocarbon liquids are superior in solvent or dispersing action to aliphatic liquids. In some cases it is of great advantage to use mixtures of the liquids.

Other organic liquids of artificial origin such as, carbon bisulphide, acetone, aniline, amyl acetate, carbon tetrachloride and many other organic derivatives may be used alone or mixed with each other or with the above mentioned liquids.

All of these oils or other organic liquids are emulsified by simply spraying, atomizing, agitating or stirring them into an equal volume of the above mentioned emulsifying medium, i. e., water containing the protective colloid or emulsifying agent.

After preparing the suspension of non-fluid or solid material and the emulsion of oil or other organic liquid, they are then mixed in proportions depending upon the desired viscosity of the resulting emulsified liquid.

For example: 1. An emulsion of creosote oil, added to a suspension of asphaltite, asphalt, pitch, etc., containing twice as much of the suspended matter by weight as the emulsion contains of creosote oil, will produce an emulsion of soft asphaltite, soft asphalt, or soft pitch, etc., the globules of which are of about the same order of viscosity as very soft putty.

2. An emulsion of solvent naphtha added to suspensions of asphaltite, asphalt, pitch, etc., containing four times as much as by weight of the suspended materials as the emulsion contains of solvent naphtha, will produce emulsions of these materials whose globules will be of the same order of viscosity as in example 1. It must be remembered in this connection that solvent naphtha is a much lighter oil than is cresote oil, so that a much less quantity is needed to produce by this method emulsions of the same order of viscosity.

3. What holds with respect to the viscosity of the globules of the resulting viscous emulsions in example 2 also holds in about the same order when emulsions of turpentine oil or other lighter wood or wood tar distillates are added to suspensions of shellac, copal, resin, gum resins, etc.

4. If it is desired to make emulsions the globules of which are more viscous than those mentioned above, emulsions of heavier oils, or a smaller proportion of the emulsions of lighter oils, or larger proportions of the non-fluid or solid in the form of a suspension are added.

5. If it is desired to make emulsions the globules of which are less viscous than those mentioned above, the reverse of example 4 is practiced, i. e., emulsions of lighter oils or a larger proportion of the oil emulsions to the suspensions of solid or non-fluid materials is added.

6. Emulsions of coal tar oils, resinous wood oils, and petroleum oils are effective in the order named for producing viscous emulsions when added to suspensions of asphaltites, asphalts, or pitches.

7. Fluxing bituminous substances with rosin and fatty acid pitches increases in some cases the ease with which emulsions of viscous liquid can be prepared from them by this method.

8. Mixing oils or other liquids increases in some cases the ease with which emulsions of viscous liquids can be prepared by this method from them. In general, all combinations of oil emulsions or suspensions of non-fluid substances may be used.

9. It is to be remembered that the viscosity of any emulsion in which water is the dispersing agent is as a rule very much less than the viscosity of the emulsified material. In all of these emulsions, water plus an emulsifying agent or protective colloid is the external phase, while the dispersed viscous liquid is the internal phase. The per cent of emulsified oil or suspended non-fluid or solid determines the viscosity of the internal phase, while the amount of the emulsifying medium determines the viscosity of the system as a whole, so that the emulsion itself may not be much more viscous than water while the viscosity of its dispersed globules may be equal to or greater than that of a semi-solid.

In mixing the suspensions with an emulsion, the usual practice is to add the emulsion slowly to the suspension, or vice versa, meanwhile agitating vigorously.

It must be remembered that from the nature of a system as defined by the term suspension that the material which is to be suspended must be insoluble or only partially soluble in the dispersing medium.

In the following claims, by the term "non-fluid," it is to be understood that applicant intends to include the class of substances set forth on page 2, lines 17 to 25 and also crystalline solids with sharp melting points.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process for making suspensions of non-fluid organic materials, adding such materials to a suspension medium containing a protective colloid, grinding and then agitating the resulting mixture.

2. In a process for making suspensions of non-fluid organic materials, adding such materials in a finely divided condition to a suspension medium containing a protective colloid while vigorously stirring and agitating said suspension medium.

3. In a process for making suspensions of non-fluid bituminous materials, adding such materials to a suspension medium containing a protective colloid, grinding and then agitating the resulting mixture.

4. In a process for making suspensions of non-fluid bituminous materials, adding such materials in finely divided condition to a suspension medium containing a protective colloid while vigorously stirring and agitating said suspension medium.

5. In a process for making suspensions of non-fluid organic materials, adding such materials in a finely divided condition to a suspension medium containing a protective colloid while vigorously stirring and agitating said suspension medium, then grinding and agitating the latter.

6. In a process for producing emulsions of viscous liquids and semi-solids, adding a suspension of non-fluid organic material to an emulsion of an organic liquid, said liquid being of such nature that it will flux with, disperse, or dissolve partly or wholly the non-fluid material.

7. In a process for producing emulsions of viscous liquids and semi-solids, adding a suspension of non-fluid hydrocarbon to an emulsion of an organic liquid, said liquid being of such nature that it will flux with, disperse, or dissolve, partly or wholly said hydrocarbon.

8. In a process for producing emulsions of viscous liquids and semi-solids, adding a suspension of non-fluid organic material to an emulsion of an oleaginous substance, said substance being of such nature that it will flux with, disperse, or dissolve partly or wholly the non-fluid material.

9. In a process for producing emulsions of viscous liquids and semi-solids, adding a suspension of non-fluid hydrocarbon to an emulsion of an oleaginous substance, said substance being of such nature that it will flux with, disperse, or dissolve partly or wholly said hydrocarbon.

10. In a process for producing emulsions of viscous liquids and semi-solids, adding a suspension of non-fluid, bituminous material to an emulsion of an organic liquid, said liquid being of such nature that it will flux with, disperse, or dissolve partly or wholly the non-fluid, bituminous material.

11. In a process for producing emulsions of viscous liquids and semi-solids, adding a suspension of non-fluid, bituminous material to an emulsion of an oleaginous substance, said substance being of such nature that it will flux with, disperse, or dissolve partly or wholly the non-fluid, bituminous material.

12. In a process for producing emulsions of viscous liquids and semi-solids, adding a suspension of non-fluid, asphaltic material to an emulsion of an organic liquid, said liquid being of such nature that it will flux with, disperse, or dissolve partly or wholly the non-fluid, asphaltic material.

13. In a process for producing emulsions of viscous liquids and semi-solids, adding a suspension of non-fluid, asphaltic material to an emulsion of an oleaginous substance, said substance being of such nature that it will flux with, disperse, or dissolve partly or wholly the non-fluid, asphaltic material.

14. A suspension of non-fluid, bituminous material in a medium containing a protective colloid, said medium constituting the continuous or external phase.

15. A suspension of non-fluid, asphaltic material in a medium containing a protective colloid, said medium constituting the continuous or external phase.

16. A dispersion of coalesced particles of non-fluid, organic material and oleaginous material in a medium containing a protective colloid, said medium constituting the continuous or external phase.

17. An emulsion of coalesced particles of non-fluid, organic material and oleaginous material in water containing a protective colloid, said water constituting the continuous or external phase.

18. A dispersion of coalesced particles of non-fluid hydrocarbon and oleaginous material in a medium containing a protective colloid, said medium constituting the continuous or external phase.

19. An emulsion of coalesced particles of non-fluid, hydrocarbon and oleaginous material in water containing a protective colloid, said water constituting the continuous or external phase.

20. An emulsion of coalesced particles of non-fluid, bituminous material and oleaginous material in a medium containing a protective colloid, said medium constituting the continuous or external phase.

21. A dispersion of coalesced particles of non-fluid, asphaltic material and oleaginous material in a medium containing a protective colloid, said medium constituting the continuous or external phase.

JACQUE C. MORRELL.